United States Patent [19]

Badrak et al.

[11] Patent Number: 4,618,269
[45] Date of Patent: Oct. 21, 1986

[54] HARDENED BEARING SURFACE AND METHOD OF FORMING SAME

[75] Inventors: Robert P. Badrak, Missouri City; Terry H. Mayo, Houston, both of Tex.

[73] Assignee: Reed Tool Company, Houston, Tex.

[21] Appl. No.: 777,279

[22] Filed: Sep. 18, 1985

[51] Int. Cl.$^4$ .............................................. F16C 17/10
[52] U.S. Cl. ...................................... 384/95; 384/625
[58] Field of Search .................. 384/95, 280, 276, 92; 308/241; 175/371, 374

[56] References Cited

U.S. PATENT DOCUMENTS

| 4,243,867 | 1/1981 | Earle et al. | 219/121 LC |
| 4,257,654 | 3/1981 | Keepers | 308/241 |
| 4,303,137 | 12/1981 | Fischer | 175/374 |

Primary Examiner—Lenard A. Footland
Attorney, Agent, or Firm—Vinson & Elkins

[57] ABSTRACT

A hardened bearing surface (36, 38, 42, 48, 50, 51 and 52) on a component (14, 16) of a rotary cutter drill bit (10) and the method of forming same. A composite mix (60) of alloy material (56) and base material (54) forms the hardened bearing surface (36, 38, 42, 48, 50, 51 and 52) with the alloy material (56) consisting of at least ten (10) percent of the adjacent base material (54) and of an optimum of around fifty (50) percent. The alloy material (56) of predetermined amounts of predetermined elements is positioned on the base material (54) and a precisely controlled high energy density source, such as a laser beam (58), melts the alloy material (56) and adjacent base material (56) to form the composite mix (60) defining the hardened bearing surface.

9 Claims, 6 Drawing Figures

HARDENED BEARING SURFACE AND METHOD OF FORMING SAME

BACKGROUND OF THE INVENTION

This invention relates to a hardened bearing surface and method of forming, and particularly to such a hardened bearing surface on a drill bit using rotary cutters.

It is desirable under certain conditions to have a bearing surface formed of a material harder than the remainder of the base material on which the bearing surface is formed. It is necessary at times to perform other machining or finishing operations on the base material, such as the drilling of openings, cutting of grooves, or welding, and for these purposes, it is desirable that the properties of the base material be suitable for welding and machining. For example, it is difficult to weld materials with a carbon content above about 0.35 percent and it is more difficult to machine materials when the hardness is over a Rockwell C (RC) hardness of about forty (40). For a bearing surface, however, it is desirable to have an RC hardness of around fifty-five (55) or sixty (60), to improve the wear characteristics of the bearing, thereby prolonging the life and minimizing replacement of such bearing. A localized hardening of the base material at those areas where bearing surfaces are provided provides the necessary hardness. Other desirable properties in the bearing areas include a so-called high hot hardness which permits the bearing to retain its hardness at high temperatures, such as around 500° C., for example.

For example, U.S. Pat. No. 4,303,137 dated Dec. 1, 1981, shows a method for making a cutter for a rock bit in which the ball race in the cutter is hardened to obtain a Rockwell C hardness of around fifty-five (55) to sixty (60). This is accomplished by applying energy to the surface of the ball race by induction heating, an electron beam, or a laser beam to austenitize a surface layer which is rapidly cooled for hardening.

Another arrangement for forming a hardened bearing structure is illustrated in U.S. Pat. No. 4,474,861 dated Oct. 2, 1984 in which a bearing structure is provided having a hard-facing metal with intervening soft metal areas to form a composite bearing surface. The hard-facing metal is metallurgically bonded to the underlying base metal. The fusion or metallurgical bonding of the hard-facing metal to the base metal is provided by a high intensity energy beam, such as a laser beam, to effect fusion of the two metal compositions or materials. The composite bearing surface formed has spaces between the hard metal filled with a melt of a soft metal which has a Rockwell C hardness of at least five (5) units less than the hardness of the hard metal.

U.S. Pat. No. 4,243,867 dated Jan. 6, 1981 illustrates an apparatus for fusibly bonding a powder coating material to a base material utilizing a laser beam to melt the powder material thereby to form a fusible bond of coating material on the surface of the base material. With the coating material illustrated, it is possible for the bearing surface to have properties substantially different from the substrate. However, the bond between the coating material and the base material is a limiting factor for some applications such as a lug journal ball bearing race in a rotary cutter drill bit.

SUMMARY OF THE INVENTION

The present invention is directed to the application of an alloy material of predetermined properties and elements to a base material with the alloy material being alloyed to the base material through a melting of the alloy material and subjacent base material to form a composite mix utilizing a high energy density heat source, such as a laser beam. This permits any desired portion or area of a base material to have selected properties by heating or heat treating a predetermined alloy material on the base material from a high energy density source to melt the alloy material and a portion of the adjacent base material to form a composite mix of predetermined properties, such as hardness. A high degree of control may be provided by the selection of an appropriate alloy materials and thermal steps involved. The composite mix or melt of base and alloy material is of a thickness preferably in the range of around 0.015 inch to 0.050 inch in order to obtain a strong fusible bond between the base and added alloy material. However, thicknesses between 0.005 inch and 0.125 inch will function effectively under certain conditions.

The so-called melt or composite mix zone contains a generally homogeneous cross section of base and alloy materials dependent primarily on the amount and composition of alloy material added and the heat treating. The percent of alloy material in the final composite mix zone forming the hardened bearing surface will vary from ten (10) percent to ninety (90) percent, depending upon such factors as the chemical composition of the base and alloy materials, the type of heat treatment, and the expected use of the bearing. This composite mix or alloyed zone possesses a uniform strong continuous bond between the base material and the alloyed zone. It is believed that best results will be obtained with the alloy material being between thirty (30) to seventy (70) percent of the composite mix, however.

The method comprises the depositing of an alloy material containing predetermined amounts of selected elements on the surface of the base material desired to be hardened. The tailoring of the added alloy material to specific requirements and desired chemical properties permits a wide range of desired elements and percentages thereof to be utilized in the alloy material. An essential element in the alloy material is the carbon content, for most applications, and a carbon content by weight in the final composite mix is preferably around 0.40 percent to 0.60 percent. The base material of the lugs forming the drill bit body on which the rotary cutters are mounted for rotation is generally a low alloy low carbon steel material having an RC hardness normally below around thirty-five (35) as subsequent operations such as the drilling of holes are substantially more difficult with an RC hardness above around forty (40) and welding becomes more difficult with carbon contents above about 0.30 percent. The carbon content of the alloy material added ranges between 0.30 percent and 1.25 percent. The alloy material includes other suitable elements, depending on the intended use and desired properties, and at least one additional element is normally selected from the group consisting of titanium (Ti), cobalt (Co), vanadium (V), chromium (Cr), zirconium (Zr), nickel (Ni), niobium (Nb), molybdenum (Mo), hafnium (Hf), tantalum (Ta), tungsten (W), and manganese (Mn). A preferred alloy material forms a high hardness composite mix exhibiting high hot hardness with the low alloy steel forming the base material.

The heating of the alloy material and base material is from a high energy density heat source and may comprise a laser beam, an electron beam, or induction heating. The alloy material may be prepositioned on the base material prior to heating, or may be fed into the electron beam or laser beam for being directed onto the surface of the base material by the beam.

The alloy material is heated for a relatively short time period to melt the alloy material and a portion of the adjacent base material to form the composite mix fusibly bonded to the base material by such melting. As indicated above, the percentage of alloy material in the composite mix will vary and may, for example, comprise around twenty-five (25) percent of the composite mix with the base material comprising around seventy-five (75) percent. However, it is to be understood that the percentages of the alloy material and base material would vary depending on such factors as the final hardness desired and other properties desired in the bearing surface.

The composite mix is cooled and the surface of the bearing surface finished to provide a smooth bearing surface which normally would have an RC hardness around fifty-five (55).

It is an object of this invention to provide a hardened bearing surface and method of forming same with the bearing surface having metallurgical properties different from the remainder of the base material on which the bearing surface is formed.

A further object of this invention is to provide such a hardened bearing surface from a composite mix of alloy material and base material which has been heated by a high density heat source.

An additional object is to provide a locally hardened bearing surface for the lug of a rotary drill bit on which a cutter is mounted for rotation with the hardened bearing surface formed of a composite melted mix of alloy material and base material.

Another object is to provide a locally hardened bearing surface on a rotary cutter of a rotary drill bit.

Other objects, features, and advantages of this invention will become more apparent after referring to the following specification and drawings.

DESCRIPTION OF THE INVENTION

Figure 6:
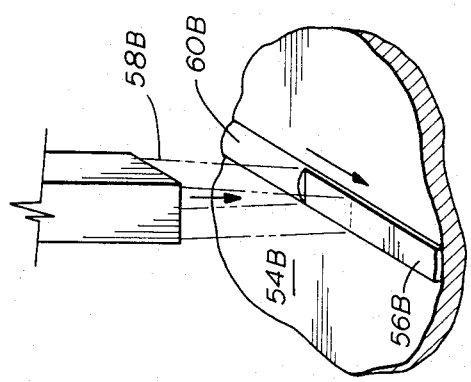
Figure 5:
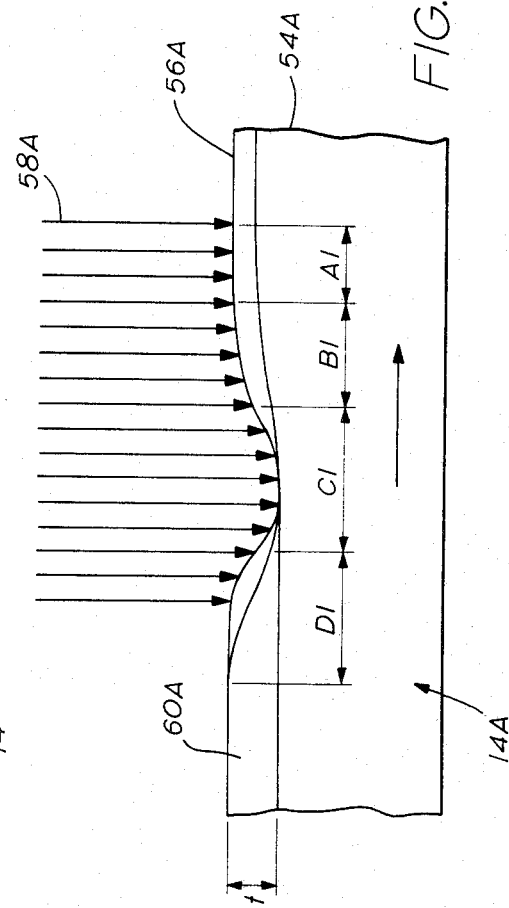

FIG. 5 is a schematic of another embodiment of the method of this invention in which the alloy material is prepositioned on a selected surface of a base material and is melted by a high intensity energy source to form a composite mix of alloy material and adjacent base material thereby to provide a fusible bond; and FIG. 6 is a schematic of an embodiment of the invention showing the alloy material prepositioned on the base material in a so-called cloth of the same width as a laser beam beneath which the base material and alloy material are passed for melting.

Figure 2:
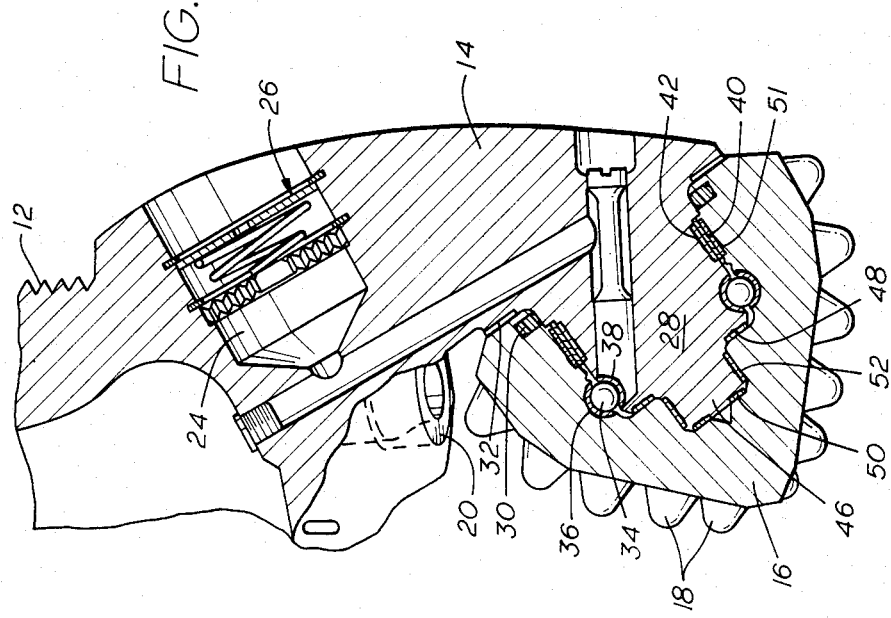
FIG. 2 is a partial longitudinal sectional view illustrating the mounting of a rotary cutter on the lug forming a segment of the bit body.
Figure 1:
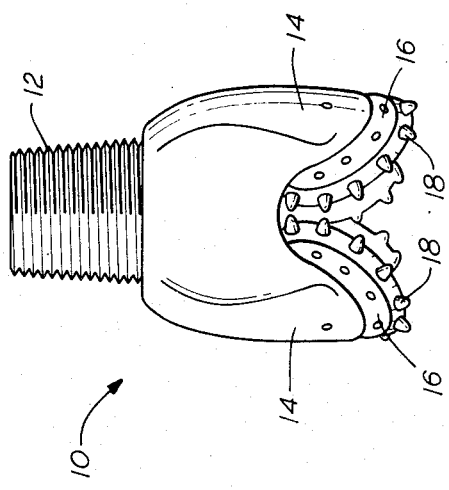
FIG. 1 is an elevation of a rock drill bit showing a plurality of rotary cutters on the end thereof.

Referring now to the drawings for a better understanding of the invention, and more particularly to FIGS. 1 and 2, a typical rock drill bit is illustrated generally at 10 having a threaded upper end at 12 which may be connected to the lower end of a drill string for drilling an oil well or the like. Rotary drill bit 10 is normally formed of three elongated body sections or lugs indicated at 14 which are welded together to form the completed bit body. Each body section or lug 14 has a roller cutter 16 mounted thereon for rotation. Cutter 16 has cutting teeth 18 thereon for engaging in cutting relation a formation to be drilled. Drilling fluid is supplied through suitable nozzles 20 from the drill string to aid in the cutting operation as well known in the art. A lubricant channel is shown at 22 which communicates with a lubricant reservoir 24 having a pressure compensator indicated generally at 26 therein to maintain a uniform lubricant pressure.

At the end of each lug 14 a journal indicated generally at 28 is shown for mounting cutter 16 thereon for rotation. An annular resilient seal 30 is mounted between cutter 16 and the adjacent shoulder 32 of lug 14 to hold the lubricant within cutter 16 and prevent drilling fluid from contact with journal 28. Ball bearings shown at 34 are mounted for relative rotation in races 36 and 38 on respective cutter 16 and journal 28. A floating journal bushing 40 is positioned between cutter 16 and journal 28.

Lug 14 is formed of a low alloy steel which is interpreted as a steel having less than around a six (6) percent alloy content by weight. Lug 14 has a Rockwell C (RC) hardness of around thirty (30) which is desirable for subsequent working operations on lug 14 such as the drilling of holes or cutting of grooves, as an RC hardness above around forty (40) is difficult for such operations as boring or cutting. However, an RC hardness of under around forty-five (45) is not adequate to provide wear characteristics for a long life bearing surface on journal 28.

Figure 3:
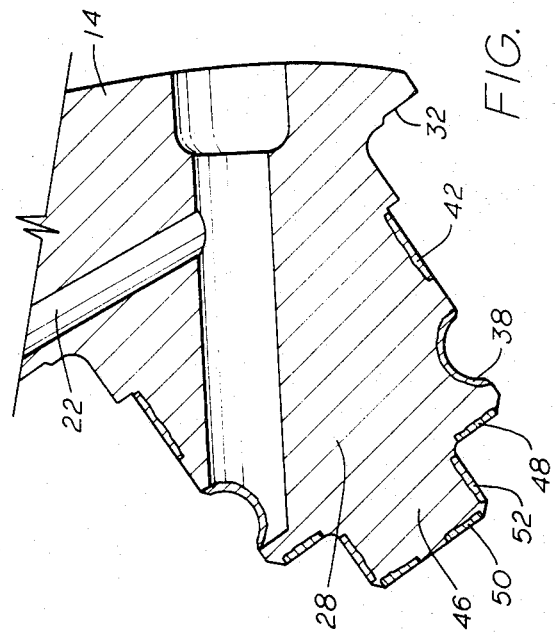
FIG. 3 is a partial elevation of the lug on which a cutter is mounted and illustrating the several bearing surfaces thereon which may be hardened in accordance with the present invention.

Journal 28 has a pin end 46 which receives and fits within cutter 16. As shown particularly in FIG. 3, the annular surfaces of journal 28 which form bearing surfaces are illustrated at race 38 for ball bearings 34, surface 42 adjacent bushing 40, bearing surface 48 adjacent pin end 46, bearing surface 50 on pin end 46, and bearing surface 52 on pin end 46. As shown in FIG. 2, cutter 16 has a bearing surface at 51 adjacent bushing 40 and a bearing surface formed by race 36 adjacent ball bearings 34. Bearing surfaces 48 and 50 provide bearing surfaces for outward thrust loads. Bearing surfaces 42, 51, and 52 provide bearing surfaces for radial loads. Bearing surfaces 36 and 38 provide bearing surfaces for both radial and thrust loads.

It is to be understood that all of the bearing surfaces shown on cutter 16 and journal 28 normally would not require the same material properties dependent on such factors, for example, as the type of bearing, friction-antifriction requirements, the separate bearing elements utilized, and the amount of the thrust and radial loads for which drill bit 10 is designed. Likewise, it may be desirable to have some of the bearing surfaces of a hardness different from some of the other bearing surfaces, dependent on such factors as indicated above. A hardness for such bearing areas or surfaces desired to be hardened would preferably be around an RC hardness of fifty-five (55). It is believed that RC hardnesses from forty-five (45) to sixty-five (65) could function effectively. To obtain a desired hardness for selective bearing surfaces 36, 38, 42, 48, 50, 51 and 52 an alloying process or method is employed which utilizes an alloy material consisting of predetermined amounts of predetermined elements. An entire range of material properties may be selected from various alloy elements comprising the alloy material thereby permitting the tailoring of a specific alloy material for an individual application.

Figure 4:
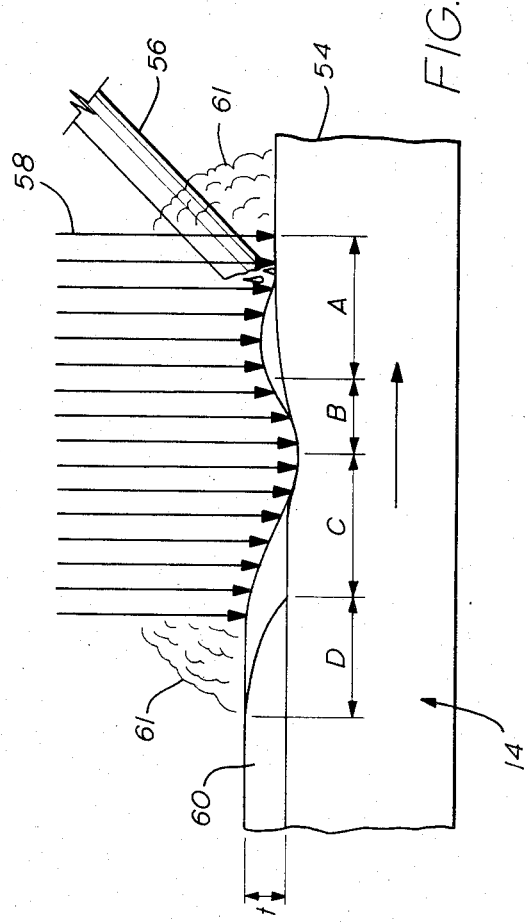
FIG. 4 is a schematic showing the method of this invention in which the alloy material is fed into a laser beam for depositing onto the surface of the base material and subsequent melting of the alloy material and base material to form a composite mix thereof.

Referring to FIG. 4, a method is illustrated in which an alloy material shown at 56 is fed into a high intensity energy source shown at 58 directed onto a base material 54 of lug 14. The high intensity energy source which may comprise a laser beam melts alloy material 56 and a portion of base material 54 adjacent alloy material 56 to form a composite mix. Base material 54 is moved at a predetermined rate in the direction of the arrow beneath laser beam 58 and the melting and mixing of base material 54 and alloy material 56 occurs in several zones. As shown in FIG. 4, zone A is a preheating zone in which the alloy material 56 and base material 54 are preheated. Zone B is an alloy melting zone in which a melting of alloy material 56 occurs on the surface of base material 54. In zone C base material 54 is melted and mixed with alloy material 56. In zone D a solidifying of the composite mix 60 of base material 56 and alloy material 54 is provided. The final composite mix 60 of the previously melted base material 54 and alloy material 56 may be of a thickness t around 0.030 inch, for example, which is adequate to provide a strong fusible bonding of the base and alloy materials 54, 56. A preferred range of thickness t is between around 0.015 inch to 0.050 inch, although thicknesses will function satisfactorily in the range of between 0.005 inch to 0.125 inch for certain applications. While the percentage of alloy material 56 and the percentage of base material 54 in the final composite mix 60 may vary depending on several factors, an optimum composite mix of around fifty (50) percent base metal 54 and fifty (50) percent alloy material 56 is preferred. It is believed that best results are obtained with base material 54 comprising between around thirty (30) percent and seventy (70) percent of the composite mix for performing a strong metallurgical or fusible bond between alloy material 56 and base material 54. However, it is believed that a percentage of base material 54 as low as around ten (10) percent of composite mix 60 may function satisfactorily in certain situations, while a maximum of around ninety (90) percent would function adequately. Correspondingly, alloy material 56 in composite mix 60 would likewise vary from a maximum of around ninety (90) percent to a minimum of around ten (10) percent. Under certain conditions, it is possible that composite mix 60 closely adjacent base material 54 may not be uniform and a lesser amount of alloy material 56 could be present directly adjacent base material 54 than in the remainder of the composite mix 60.

As a specific but non-limiting example for a bearing surface on lug 14, base material 54 comprised a low alloy low carbon steel of 0.017–0.23 percent carbon, 0.70–1.05 percent manganese, 0.15–0.35 percent silicon, 0.35–0.65 percent chromium, and 0.20–0.30 percent molybdenum. Powdered alloy material 56 was fed into laser beam 58 and directed onto the outer surface of base material 54. Alloy material 56 had a composition of 0.60 percent carbon by weight, 0.32 percent manganese, 0.015 percent silicon, 0.44 percent nickel, and 0.55 percent molybdenum. The laser beam had a power level of 4.5 kw and a spot size of 0.35 inch by 0.275 inch. A temperature over around 2750° F. was applied by the laser beam for around fifteen (15) seconds. An argon shielding gas was used around the laser beam 58 as illustrated at 61 on FIG. 4 to shield the molten alloy from the atmosphere. The composite mix 60 was cooled by the transfer of heat to the inner core of the material on which the bearing surface is formed. The carbon content by weight of composite mix 60 is around 0.45 percent and preferably is within the range of around 0.40 percent to 0.60 percent.

As an alternate method for forming a bearing surface on lug 14 which is formed of a low alloy steel, lug 14 may first be heated at a temperature of 1600° F. for around one (1) hour, then quenched in oil at a temperature of around 125° F. for around ten (10) minutes. After being air cooled, the laser beam is applied as in the above example. Then, the bearing surface is retempered at a temperature of around 400° F. for one (1) hour.

Cutter 16 is normally formed from a higher alloy steel than lug 14 as welding operations are not performed on cutter 16. For application of the bearing surfaces on cutter 16, the cutter is first heated to a temperature of around 1600° F. for one hour. Then, the cutter is quenched in oil of around 125° F. for around four (4) minutes. Next, the cutter is tempered at about 1000° F. for around two (2) hours, and then air cooled. The laser beam is then applied substantially as in the above example. Then, the cutter is retempered at 400° F. for around one (1) hour.

Alloy material 56 which is melted and metallurgically bonded to base material 54 may be formed of several different elements, as indicated by the above example. However, it is believed that alloy material 56 would provide satisfactory results with the use of carbon and at least one additional element selected from the group consisting of titanium (Ti), cobalt (Co), vanadium (V), chromium (Cr), zirconium (Zr), niobium (Nb), nickel (Ni), molybdenum (Mo), hafnium (Hf), tantalum (Ta), tungsten (W), and manganese (Mn) which form a high hardness composite mix 60 with the low alloy steel of base material 54. A carbon content by weight of alloy material 56 is preferably around 0.45 percent for as-alloyed and tempered properties. The preferred carbon content by weight in the composite mix to obtain desired properties after subsequent quench and tempering steps or operations is preferably around 0.80 percent. However, a final carbon content range of between 0.30 percent to 1.25 percent by weight in alloy material 56 is believed to obtain satisfactory results. The remaining elements added to alloy material 56 are so-called carbide forming elements and the selection of such elements and their percentages would vary on the different types of material properties desired. Thus, the selection of a predetermined alloy material 56 is relatively easy to control as the method for application of alloy material 56 is the same regardless of the chemical elements in alloy material 56.

The alloy material 56 is shown in FIG. 4 being fed directly into laser beam 58. However, alloy material 56 may be prepositioned onto the surface of base material 54 prior to the application of laser beam 58. This method is illustrated in FIG. 5 in which base material 54A has alloy material 56A in the form of a powder prepositioned onto the surface of base material 54A with the base material 54A and alloy material 56A thereon traveling beneath laser beam 58A as indicated by the arrow. Zone A1 shows the preheating of the prepositioned alloy material 56A and base material 54A.

Zone B1 shows the melting of alloy material 56A and a portion of base material 54A. Zone C1 shows the additional melting of base material 54A and the mixing of base material 54A with melted alloy material 56A. Zone D1 shows the solidifying of the mixed base material 54A and alloy material 56A to form composite mix 60A having a thickness t of substantially the same thickness t as composite mix 60 shown in FIG. 4.

The alloy material may be positioned onto a base material in several different manners such as, for example, by alloy rods, alloy powder, alloy strips, or by so-called alloy cloth containing selected alloy materials. Referring to FIG. 6, a schematic illustrates the alloy material application by alloy cloth and a laser beam. The alloy cloth illustrated at 56B is provided in a strip having generally the same width as the width of the laser beam shown at 58B. The flexible cloth is prepositioned onto base material 54B which is fed under laser beam 58B. A suitable alloy cloth is manufactured and sold by Imperial Clevite, Inc. under the name "Conforma-Clad" and contains the alloy powder within a plurality of polytetrafluoroethylene fibers that entrap the powdered alloy material in a dense well bonded arrangement. Base material 54B having an alloy cloth 56B thereon travels in the direction of the arrow. Laser beam 58B melts the alloy material 56B along with a portion of the base material 54B to form composite mix 60B as in the embodiment shown in FIGS. 4 and 5.

While the high energy density source is shown as a laser beam, it is understood that other types of high energy density heat sources may be employed, such as an electron beam, or by induction heating. Also, further heat treating may be provided after the composite mix is solidified and this can provide hardening, if desired. It is noted that flame type heat or electric arc heat is not employed as it is difficult by such types of heat to provide a uniform heating and precise control which are required for the present invention. By the use of a laser beam a very close control is provided with a high degree of uniformity which is required for precise control of the composite mix. While welding can provide a composite mix, the desired quality would be provided by welding as a result of slag inclusion, burning of steel, or gas entrapment, all of which are involved with oxy-fuel or arc welding processes. Thus, a precisely controlled high energy density source is an important feature of this invention.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

We claim:

1. In a component for a rotary cutter rock bit having a base material formed of a low alloy low carbon steel base material with a Rockwell C hardness less than forty-five (45) and an annular bearing thereon; a hardened alloyed bearing ring defining the outer surface of said bearing and having a thickness of between 0.005 inch and 0.125 inch;

said hardened alloy bearing ring being a composite mix of an alloy material and the adjacent steel base material of said component formed from a combination of melted alloy material and base material consisting of at least 10 percent of the base material and less than 90 percent of the alloy material for fusibly bonding the alloy and base materials, said hardened alloyed bearing ring having a Rockwell C hardness of at least forty-five (45).

2. In a component for a rotary cutter rock bit as set forth in claim 1 wherein said component is a lug on which a rotary cutter is mounted for rotation.

3. In a component for a rotary cutter rock bit as set forth in claim 1 wherein said component is a rotary cutter.

4. In a component for a rotary cutter rock bit as set forth in claim 1 wherein said alloy material consists essentially of carbon and at least one other element selected from the group consisting of chromium, molybdenum and manganese.

5. In a component for a rotary cutter rock bit as set forth in claim 1 wherein said hardened alloyed bearing ring has an optimum thickness of between 0.015 inch and 0.050 inch.

6. In a component for a rotary cutter rock bit as set forth in claim 1 wherein said composite mix forming said hardened alloy bearing ring has a Rockwell C hardness between forty-five (45) and sixty-five (65).

7. A hardened alloyed bearing surface having a Rockwell C hardness of at least forty-five (45) on a selected annular surface of a base material having a Rockwell C hardness less than forty (40), said hardened bearing surface having a thickness between 0.005 inch and 0.125 inch.

said hardened alloy bearing ring being a composite mix of an alloy material and a portion of the adjacent base material formed from a composite melt of combined alloy material and base material consisting of at least 10 percent base material for fusibly bonding the alloy material and adjacent base material;

said alloy material consisting essentially of carbon and at least one additional element selected from the group consisting of carbon and at least one additional element selected from the group consisting of titanium (Ti), vanadium (V), cobalt (Co), nickel (Ni), chromium (Cr), zirconium (Zr), niobium (Nb), molybdenum (Mo), hafnium (Hf), tantalum (Ta), tungsten (W), and manganese (Mn).

8. A hardened alloyed bearing surface as set forth in claim 7 wherein said bearing surface has a carbon content by weight between around 0.40 percent and 0.60 percent.

9. A hardened alloyed bearing surface as set forth in claim 8 wherein the carbon content by weight of the alloy material from which the bearing is formed is between 0.30 percent and 1.25 percent.

* * * * *